United States Patent [19]

Nishii et al.

[11] Patent Number: 4,940,290

[45] Date of Patent: Jul. 10, 1990

[54] HYDRAULIC BRAKING SYSTEM

[75] Inventors: Michiharu Nishii, Toyota; Yoshihiko Tada, Oaza; Genji Mizuno, Toyoake, all of Japan

[73] Assignee: Aisin Seiki Kabushiki Kaisha, Kariya, Japan

[21] Appl. No.: 230,877

[22] Filed: Aug. 11, 1988

[30] Foreign Application Priority Data

| Aug. 13, 1987 | [JP] | Japan | 62-202250 |
| Aug. 13, 1987 | [JP] | Japan | 62-202251 |
| Sep. 17, 1987 | [JP] | Japan | 62-233294 |

[51] Int. Cl.$^5$ .................... B60T 13/00; B60T 11/10
[52] U.S. Cl. ........................ 303/6.01; 303/2; 303/84.2; 60/547.1; 188/151 A
[58] Field of Search .............. 303/2, 6.01, 9.61, 13, 303/84.2, 92, 114; 188/151 A, 151 R; 137/112, 113; 60/547.1, 563, 565, 581, 582, 591

[56] References Cited

U.S. PATENT DOCUMENTS

| 2,416,091 | 2/1947 | Fitch | 137/112 |
| 3,503,655 | 3/1970 | Heimler | 303/84.2 |
| 3,727,986 | 4/1973 | Koivuner | 303/2 |
| 4,050,748 | 9/1977 | Belart | 303/114 |
| 4,404,803 | 9/1983 | Steffes | 60/591 X |
| 4,530,209 | 7/1985 | Steffes | 60/563 X |
| 4,642,989 | 2/1987 | Belart | 60/574 |
| 4,671,066 | 6/1987 | Belart | 60/574 |
| 4,685,749 | 8/1987 | Otsuki et al. | 137/112 X |

Primary Examiner—Andres Kashnikow
Assistant Examiner—Timothy Newholm
Attorney, Agent, or Firm—Burns, Doane, Swecker & Mathis

[57] ABSTRACT

A hydraulic braking system for controlling the hydraulic pressure of the brake actuator and wheel cylinders includes a dynamic hydraulic pressure control system which transmits boosted hydraulic pressure in response to movement of a brake pedal. A master cylinder receives brake fluid pressure from a reservoir and transmits the fluid pressure from a pressure chamber in the master cylinder to a changeover valve. The changeover valve changes over the connection between wheel cylinders of the vehicle and the dynamic hydraulic pressure control system when the powered pressure which is transmitted from the dynamic hydraulic pressure control system is less than a predetermined pressure. A valve member of the changeover valve is movable between a first and second position so as to transmit the powered hydraulic fluid from the boost pressure chamber to the wheel cylinders of the rear wheels in a first position and block the transmission of the fluid in the second position.

2 Claims, 7 Drawing Sheets

Fig. 1

HYDRAULIC BRAKING SYSTEM

BACKGROUND OF THE INVENTION

1. Field of the Invention

The present invention relates to a braking system for use in automotive vehicles and particularly to a hydraulic braking system comprising a dynamic hydraulic pressure control system which outputs powered hydraulic pressure supplied from a powered hydraulic pressure source in response to movement of a braking pedal.

2. Description of the Prior Art

A conventional braking system for automotive vehicles provides a plurality of hydraulic circuits connecting wheel brake cylinders mounted on wheels and a hydraulic pressure control system such as a master cylinder, which is able to achieve a braking operation even if the one of the hydraulic circuits is broken. In general, a tandem master cylinder is used in a conventional dual circuit system.

Also, to reduce the force required to operate the brake pedal in the braking operation, the hydraulic braking system can be provided with a power multiplying device referred to as a servo or booster. Either compressed air, under pressure from an intake pipe, or hydraulic pressure, from a hydraulic booster, is often used as the power multiplying source. A hydraulic booster drives a hydraulic braking pressure control system such as a master cylinder with multiplied force in response to actuation of a braking pedal, with the powered hydraulic pressure output from the hydraulic booster used as the power multiplying source. For instance, Japanese Patent Laid-Open Publication No. 59-209948 has disclosed a system which includes a hydraulic pressure booster connected to a tandem master cylinder which operates as an ordinary tandem master cylinder when the hydraulic pressure booster is not operated.

Along with employment of a hydraulic pressure booster, it has also been proposed to operate the hydraulic pressure booster as a dynamic hydraulic pressure control system in the hydraulic braking pressure control system. Namely, the hydraulic braking pressure (hereinafter referred to as boosted hydraulic pressure) is controlled in response to the brake pedal with powered hydraulic pressure being applied directly to one hydraulic circuit. For example, as disclosed in Japanese Patent Laid-Open Publication No. 59-227552, the boosted hydraulic pressure from the hydraulic pressure booster is applied to the rear wheels of a front and rear wheel split braking system and thereby the stroke of a brake pedal needed for braking can be shortened.

However, such prior art is accompanied by a problem that if the powered hydraulic pressure is decreased due to the cease of operation of the powered hydraulic pressure source, the braking force to the rear wheels disappears.

Also, in view of the necessity of applying a larger braking force to the front wheels than to the rear wheels for stability of the vehicle, it is difficult to connect the front wheels to the dynamic hydraulic pressure control system.

SUMMARY OF THE INVENTION

Accordingly, it is an object of the present invention to provide brake hydraulic pressure for both front and rear wheels even when a powered hydraulic pressure is decreased.

It is another object of the present invention to provide a hydraulic braking system comprising a powered hydraulic pressure source for boosting a brake fluid pressure up to a predetermined pressure, a reservoir for storing brake fluid, a master cylinder for receiving the brake fluid pressure from the reservoir to a pressure chamber and transmitting the brake fluid pressure from the pressure chamber by a reactive piston slidably positioned in the master cylinder and which is tensioned by a return spring in response to movement of a brake pedal, a dynamic hydraulic pressure control system for adjusting and transmitting the powered hydraulic pressure from the powered hydraulic pressure source in response to one of brake pedal movement and brake fluid pressure, a plurality of wheel cylinders one of which is connected to each wheel and connected to through a divided dual passage system the dynamic hydraulic pressure control system and master cylinder, and a changeover means for changing over the connection between the wheel cylinders and the dynamic hydraulic pressure control system when the powered pressure transmitted from the dynamic hydraulic pressure control system is less than the predetermined pressure and for introducing one of the brake fluid pressure and the powered pressure to the wheel cylinders through the divided dual passage system. The changeover means may include a changeover valve for selectively changing over from a first position to connect the dynamic hydraulic pressure control system and the wheel cylinders and a second position to connect the master cylinder and the wheel cylinders.

The hydraulic braking system for vehicles of the present invention may include a dynamic hydraulic pressure control system which includes a powered hydraulic pressure chamber which is connected with a powered hydraulic pressure source through a check valve, a regulator chamber located adjacent to said powered hydraulic pressure chamber via a regulator piston which is slidably positioned adjacent said powered hydraulic pressure chamber, and a valve which selectively connects said regulator chamber to one of the powered hydraulic pressure chamber and the reservoir in response to movement of the regulator piston. Such a dynamic hydraulic pressure control system may include a regulator which provides the powered hydraulic pressure after regulating it to a predetermined pressure corresponding to the braking hydraulic pressure transmitted from a pressure chamber of the master cylinder.

Moreover, in the hydraulic braking system for vehicles of the present invention having the structure explained above, a changeover means may include a cylinder defining a first pressure chamber, a second pressure chamber separated from the first pressure chamber by a piston sliding in a cylinder hole, and an auxiliary hydraulic pressure control system including a piston driving means which activates the piston toward the first pressure chamber when the powered hydraulic pressure is higher than a predetermined pressure. The first pressure chamber may be connected through a hydraulic circuit to the master cylinder, and the second pressure chamber may be connected through a hydraulic circuit to the dynamic hydraulic pressure control system and the wheel cylinders.

BRIEF DESCRIPTION OF THE DRAWINGS

The above stated objects and following description will become apparent with reference to the accompanying drawings, wherein like numerals denote like elements, and in which:

FIG. 1 is a cross-sectional view of a first embodiment of the hydraulic braking system of the present invention, including a schematic of the hydraulic circuitry thereof;

DETAILED DESCRIPTION OF THE PREFERRED EMBODIMENT

Figure 2:
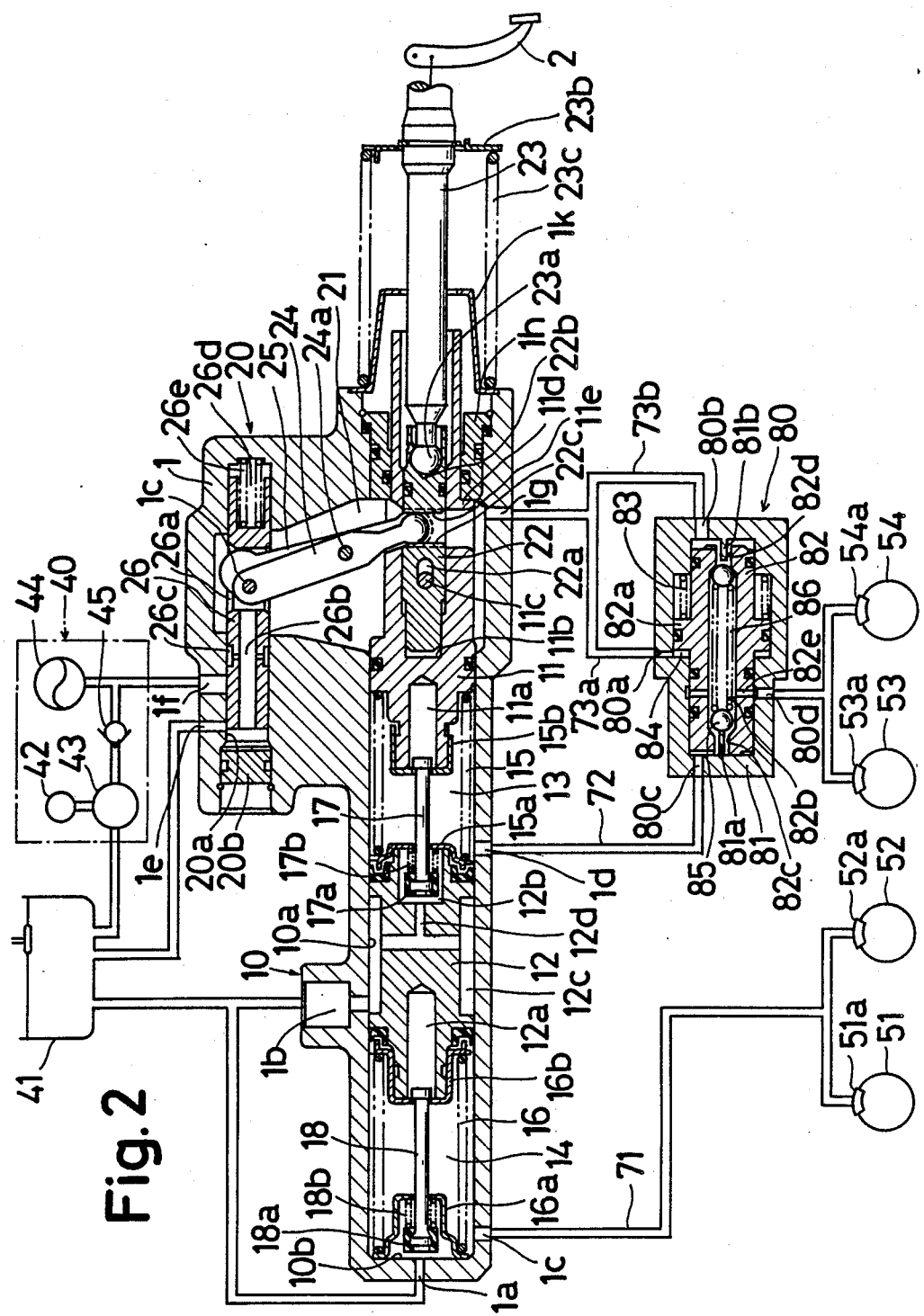
FIG. 2 is a cross-sectional view of a second embodiment of the hydraulic braking system of the present invention, including a schematic of the hydraulic circuitry thereof.

A preferred embodiment of the present invention will be explained with reference to the accompanying drawings.

Figure 1:
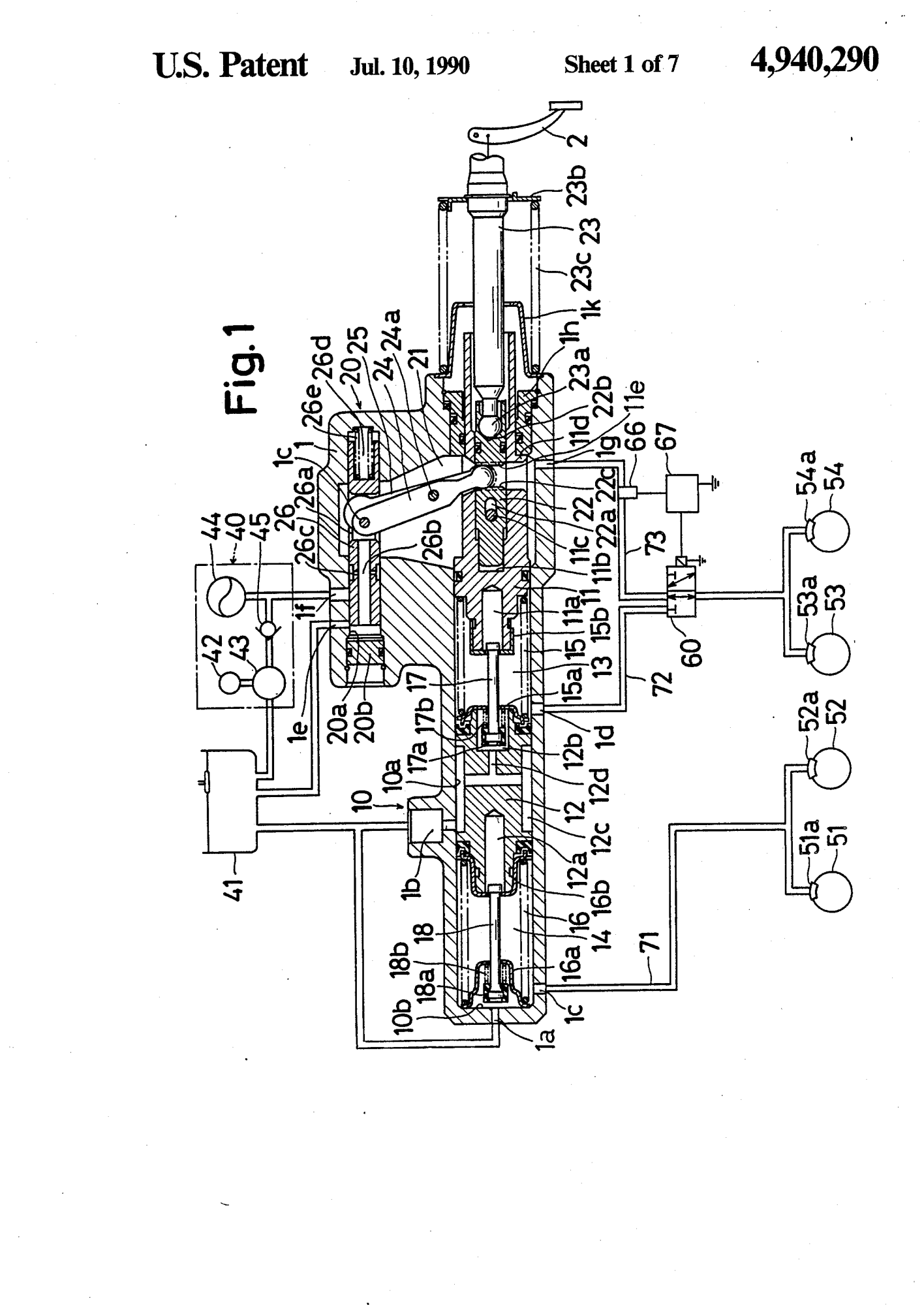

The first embodiment of the present invention is shown in FIG. 1. A housing 1 is provided with a tandem master cylinder 10 and a hydraulic booster 20 referred to as the dynamic hydraulic pressure control system. The tandem master cylinder 10 allows the first master cylinder piston 11 and the second master cylinder piston 12 (hereinafter, referred only to as first and second pistons) to be fluid-tightly engaged with the cylinder hole or passage 10a formed in the housing 1 and to be slidably arranged in series within the cylinder hole 10a.

The first pressure chamber 13 is defined between one end of first piston 11 and one end of second piston 12 and the second pressure chamber 14 is defined by the other end of second piston 12 and the closed end face of the tandem master cylinder 10.

In the first pressure chamber 13 and the second pressure chamber 14, a first return spring 15 is positioned against a retainer 15a provided on one end of second piston 12 and between the one end of first piston 11 while a second return spring 16 acting against the retainers 16a, 16b in the second pressure chamber 14. The springs 15 and 16 are positioned in the chambers 13 and 14 to abut end faces of the pistons 11 and 12 and end wall 10b. When the springs are fully tensioned, the chambers 13 and 14 are maintained at maximum volume. The housing 1 is further provided with the ports 1a and 1b connected to the reservoir 41 and the ports 1c and 1d connected to the wheel cylinders 51a to 54a mounted to the wheels 51 to 54.

The first piston 11 and the second piston 12 are respectively provided, in the axial direction, with the holes or passages 11a, 11b, 12a and 12b which extend toward the center of the pistons from the ends.

In addition, a groove 12c is formed at the circumference of the second piston 12 and this groove 12c is connected with the hole 12b through a fluid passage 12d. The hole 12a of second piston slidably receives therein one end of second valve rod 18 which is retained therein by the retainer 16b.

A valve body 18a is mounted to the other end of the second valve rod 18 and is urged by a spring 18b so as to abut and close port 1a. In the same way, the hole 11a of the first piston slidably receives therein one end of first valve rod 17 and retains it with the retainer 15b and the hole 12b of the second piston 12 receives therein the valve body 17a mounted to the other end of first valve rod 17 and biases it toward the fluid passage 12d by the spring 17b extending between the body 17a and the retainer 15a.

The center of first piston 11 is located within the pressure multiplying chamber 21 of the hydraulic pressure booster 20 defined in the housing 1. A small diameter part and a larger diameter part define the hole 11b of the first piston 11. A reactive piston 22 has a shape including a stepped portion forming a small diameter portion and large diameter portion.

This reactive piston 22 forms a transversely extending elongated hole 22a having the longer axis in the axial direction than in the radial direction. A pin 11c engages with the elongated hole 22a and is fixed to the first piston 11 to regulate movement in the axial direction of the reactive piston 22.

One end of the reactive piston 22 is provided with a ball bearing 22b for accommodating the spherical end 23a of input rod 23 which coupled with the brake pedal 2 and is thereby connected with the input rod 23.

The end of first piston 11 extending in the direction of the brake pedal has an outer diameter which is less than the other diameter portions and has a shoulder part 11d. The first piston 11 is slidably engaged in a fluid tight manner with and pivotally supported by a collar 1h clamped to the housing 1. The shoulder part 11d is urged into contact with the collar 1h by the tensioning force of the first and second return springs 15, 16 when the brake pedal 2 is not operated.

The reactive piston 22 is urged toward the brake pedal 2 by the spring 23c extending between a retainer 23b fixed to the input rod 23 and the retainer 1k fixed to the housing 1 and is supported through pressurized contact of one end of the elongated hole 22a with the pin 11c of the first piston.

The positional relationship of the first piston 11 and reactive piston 22, as explained above, is that the reactive piston 22 is closest to the brake pedal 2 than the first piston 11, thereby providing the clearance to the bottom of hole 11b. Holes 22c and 11e are provided in the overlapping radius direction in the pistons 22 and 11, respectively. The hole 22c of the reactive piston 22 is smaller than the hole 11e and the hole 22c is engaged with the spherical head portion of a support lever 24, one end of which is pivoted about a pin 1c relative to the housing 1 and for movement within the pressure multiplying chamber 21.

The hole 11e of the first piston 11 receives therein a head portion of a control lever 25 which is rotatably connected with the support lever 24 at substantially the center thereof by a pin 24a. The other end of control lever 25 is also provided with a larger diameter head portion which is received within a hole 26a provided in a spool 26 extending in the radial direction and is urged into contact with the one end of spool 26.

The housing 1 has a spool hole or opening 20a substantially in parallel with the axial direction of the master cylinder 10 and the spool 26 is slidably received therein.

The spool 26 is provided with a hole or opening 26b extending in the axial direction thereof and in communication with the hole 26a to accommodate the head portion of control lever 25 and is also provided with a drawing hole 26c connected with the hole 26b in the radial direction. The spool 26 is separated with a specified clearance from a plug 20b positioned in the flow passage when the brake pedal 2 is not depressed.

An opening 26d is formed in the other end of spool 26 and the spool 26 is urged to the left, as shown in FIG. 1, so as to be in contact with the head portion of the control lever 25. A spring 26e is received in the hole 26d so as to supply the urging force.

A port 1e connected to the reservoir 41 and a port 1f connected to the powered hydraulic pressure source 40 are connected with the housing 1 and the port 1e is connected with the hole 26b of the spool 26 through the clearance between the spool 26 and plug body 20b when the brake pedal 2 is not depressed. The spool 26 moves to the left in the figure and when the port 1f is in communication with the hole 26c, it is connected with the holes 26b, 26a and power multiplying chamber 21.

The powered hydraulic pressure source 40 is provided with a hydraulic pressure pump 43 driven by an electric motor 42 and the input side thereof is connected with the reservoir 41 while the output side thereof is connected to an accumulator 44 through the check valve 45. The powered hydraulic pressure is supplied to the port 1f and pressure multiplying chamber 21 through the accumulator 44.

The port 1c connected to the second pressure chamber 14 is connected with the wheel cylinders 51a, 52a provided respectively to the front wheels 51, 52 via the hydraulic pressure passage 71. The port 1d in communication with the second pressure chamber and the port 1g in communication with the pressure multiplying chamber 21 are respectively connected with a changeover valve 60 formed by a 3-port 2-position solenoid operated valve by the hydraulic pressure passages 72, 73 and the changeover valve 60 is connected with the wheel cylinders 53a, 54a of the rear wheels 53, 54.

The changeover valve 60 of the present invention is part of the changeover valve means which allows the wheel cylinders 53a, 54a communication with the port 1g when it is not actuated, i.e., operated, or allows communication with the port 1d when actuated or operated.

A pressure sensor 66 is provided for the pressure passage 73 and the changeover valve 60 is operated by an actuator 67 depending on the detected pressure. Namely, when the passage 73 has a predetermined boost hydraulic pressure, the changeover valve 60 is not operated and when such boost pressure is lower than the predetermined pressure, the changeover valve 60 operates so as to permit the wheel cylinders 53a, 54a to communicate with the passage 72.

The installation location of pressure sensor 66 is not restricted to the pressure passage 73 and it may be provided anywhere, as required, to realize detection of powered hydraulic pressure, such as pressure multiplying chamber 21 and powered hydraulic pressure source 40, etc. Moreover, the changeover valve means may be utilized for providing communication with the port 1d or with the port 1g, dependent on mode of operation.

Operation of the first embodiment will be explained with reference to FIG. 1 which indicates a condition where the brake pedal 2 is not depressed. The first pressure chamber 13 communicates with the reservoir 41 through the hole or passage 12b of the second piston 12, passage 12d, groove 12c and port 1b, while the second pressure chamber 14 communicates with the reservoir 41 through the port 1a and the brake fluid is filled therethrough. Accordingly, fluid pressure in the first and second pressure chambers 13, 14 is almost equal to the atmospheric pressure. The wheel cylinders 53a, 54a communicate with the pressure multiplying chamber 21 by the changeover valve 60 through the passage 73.

When the brake pedal 2 is depressed, the reactive piston 22 is pressed by the input rod 23 and one end of reactive piston 22 moves until it moves into contact with the bottom surface of hole or opening 11b of the first piston 11.

In this case, the shoulder portion 11d of first piston 11 is in contact with the collar 1h and the head portion of control lever 25 is held at the position indicated in FIG. 1. The spherical head position indicated in FIG. 1. The spherical head portion of supporting lever 24 moves by rotating clockwise about the pin 1c when the reactive piston 22 slides. With such rotation, the control lever 25 rotates counterclockwise around the pin 24a and the spool 26 moves in the same direction of movement as the reactive piston 22 (to the left in FIG. 1). Thereby, the port 1e is blocked by the spool 26 and the port 1f is in communication with the hole 26c and the brake fluid is communicated under pressure with the pressure multiplying chamber 21 from the accumulator 44, thereby increasing the fluid pressure in the pressure multiplying chamber 21. Accordingly, the reactive piston 22 is pressed, applying a reactive force to the brake pedal 2 and pressing the first piston 11. A pressing force corresponding to the difference of sectional areas existing between the small diameter portion at the shoulder part 11d and the larger diameter portion at the center is applied to the first piston 11 and it slides toward the second piston 12 against the urging force of the first and second return springs 15, 16. The support lever 24 and control lever 25 then return to their initial position relationship and therefore the spool 26 moves toward the brake pedal 2, restoring communication with the reservoir 41 and reducing the pressure within the pressure multiplying chamber 21. The powered hydraulic pressure to be supplied to the pressure multiplying chamber 21 is controlled to the predetermined boost pressure by repeating such operation.

When communication with the wheel cylinders 53a, 54a by the changeover valve 60 is interrupted, the first pressure chamber 13 does not have a volumetric change of capacity and a pressing force of the first piston 11 is transmitted to the second piston 12. Thereby, the second piston 12 slides toward the closed end surface 10b, the valve body 18a of valve rod 18 blocks the port 1a so as to form the second pressure chamber 14 as a closed space and accordingly the braking pressure is applied to the wheel cylinders 51a, 52a, through the hydraulic pressure passage 71 depending on operation of the brake pedal 2. On the other hand, the boost pressure in the pressure multiplying chamber 21 is directly applied to the wheel cylinders 53a and 54a through the pressure passage 73 depending on operation of brake pedal 2 and changeover valve 60.

Under normal operating conditions, the front wheels 51, 52 are operated with the braking pressure of the master cylinder while the rear wheels 53, 54 are operated with the boost pressure, without reduction of the capacity of the first pressure chamber 13. Therefore, the braking system proposed here assures that the stroke of the brake pedal during the braking operation is considerably short in comparison with the tandem master cylinder and the response is very quick. The braking operation can be reset by the operations reversely following those explained above.

If powered hydraulic pressure is decreased or lost for some reason, a pressure signal detected by the pressure sensor 66 is compared with the predetermined pressure by the actuator 67. When the pressure is determined to be lower than the predetermined pressure, a drive signal is issued to the changeover valve 60 is order to operate it. Thereby, the wheel cylinders 53a, 54a are changed over to the pressure passage 72 and are put in communication with the port 1d.

Under these conditions, the system functions like the ordinary tandem master cylinder. Namely, the braking pressure in the first pressure chamber 13 is applied to the wheel cylinders 53a, 54a and therefore if the braking pressure in the pressure multiplying chamber 21 is decreased and the pressure multiplying function is lost, the braking force applied to the rear wheels 53, 54 is not lost.

As explained previously, the braking force for all wheels can be kept even if the powered hydraulic pressure is lost. Therefore, the system is not limited only to that where the boost pressure in the pressure multiplying chamber 21 is applied only to the rear wheels and it is also possible to apply such boost pressure to the wheel cylinders 51a, 52a of the front wheels 51, 52 and to use the system with a diagonal operation brake system.

FIG. 2 is the second embodiment of the present invention and like elements of the first embodiment are given like numerals. Difference from the first embodiment can be found in that a hydraulic pressure control changeover valve 80 using the powered pressure as the control signal is employed in place of the 3-port 2-position solenoid controlled valve.

Namely, the hydraulic pressure control changeover valve 80 is provided with four ports 80a, 80b, 80c and 80d, the passage 73 communicated with the port 1g is divided into two portions 73a, 73b, and the powered pressure in hydraulic pressure passage 73a is used for changeover control. The piston 82 is provided with a flange 82a substantially centrally thereof and is fluidtightly and slidably positioned in the cylinder case or housing 81 forming the cylinder chamber. A larger diameter part of the housing is formed substantially centrally thereof and is provided with four ports 80a to 80d. The piston 82 is urged into contact with one interior end face of the cylinder case by a spring 83 extending between one end face of the flange 82a and a face of the large diameter part of the cylinder chamber. Under this condition, a clearance 84 is formed between the other end face of flange 82a and the opposite end face of the large diameter part of the cylinder chamber. The port 80a is open to the clearance 84 and the boost pressure supplied from the pressure passage 73a is applied to the flange 82a and therefore the piston 82 is pressed toward the right in FIG. 2 against the spring 83.

A bore 82b is formed in the axial direction within the piston 82, it is in communication with the holes 82c, 82d at both ends of piston 82 formed within the bore 82b. A pair of spherical valve bodies 85 are provided within the hole 82b and are urged in a direction to close both holes 82c, 82d by a spring 86 provided therebetween.

At both end faces of the cylinder chamber projections 81a, 81b are formed protruding internally into the holes 82c, 82d of piston 82. The projections are of a length which is longer than the axial length of holes 82c, 82d. When the piston 82 moves toward the one end face of the cylinder, the valve body 85 in the bore is pushed against spring 86 by the projection 81a or 81b, forming a clearance between the valve body and the shoulder part. Thereby, the bore 82b in the piston communicates with any of the ports 80b, 80c at both end faces of cylinder chamber.

A flow passage is formed at the top surface of both end portions of piston 82, preventing a cut-off condition when the end face of the piston is in contact with the end of the cylinder chamber. A hole or passage 82e connected to the hole 82b is radially formed on the piston 82, and is always opposite the port 80d of cylinder case 81f to allow transmission of hydraulic pressure through passage 72 or 73.

Operation of the hydraulic pressure control changeover valve 80 will now be explained. Normally, boost pressure in the pressure multiplying chamber 21 is applied to the piston 82 from the ports 80a, 80b through the passages 73a, 73b. Thereby, the pressure applied to the flange 82a moves the piston 82 to the right in FIG. 2, against the urging force of the spring 83. The one end of valve body 85 is separated, thereby, from the projection 81a and blocks the small hole 82c, and the other end thereof is urged into contact with the projection 81b and opens the small hole 82d. Powered pressure is thereby applied to the wheel cylinders 53a, 54a through the port 80b, holes 82b, 82e of piston 82 and the port 80d.

Next, when the boost pressure in the pressure multiplying chamber 21 is decreased, the piston 82 slides in the opposite direction by the urging force of spring 83 and is set to the condition of FIG. 2 because the pressure applied to the flange 82a of piston 82 through the passage 73a is decreased.

Namely, the small hole 82d is blocked and the small hole 82c is opened, and the wheel cylinders 53a, 54a are communicated with the first pressure chamber 13 through passage 72. Under these conditions, the tandem master cylinder 10 functions as an ordinary tandem master cylinder and the braking force is applied to all of the sheets 51 to 54.

Figure 3:
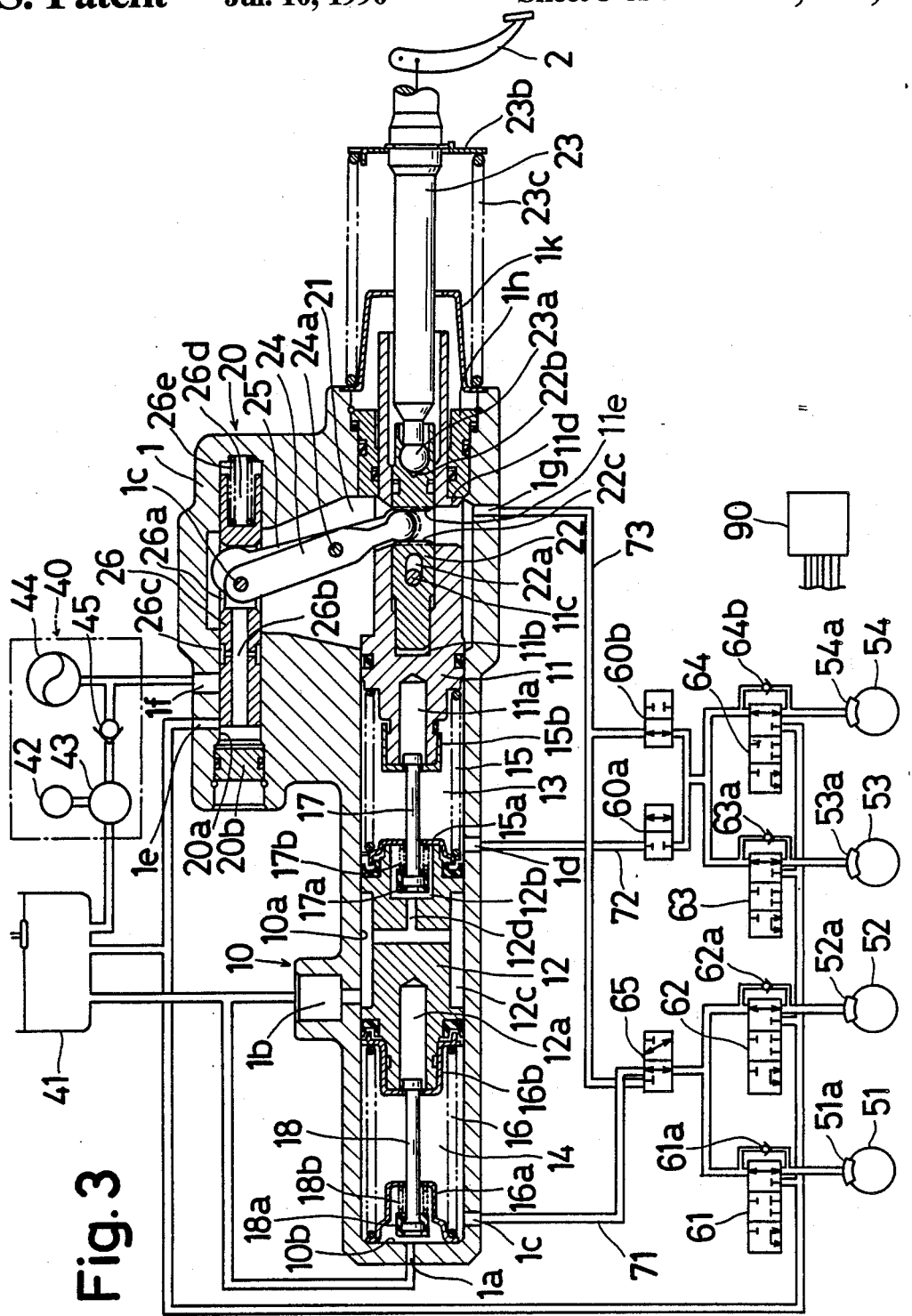
FIG. 3 is a cross-sectional view of a third embodiment of the hydraulic braking system of the present invention, including a schematic of the hydraulic circuitry thereof.

FIG. 3 shows a third embodiment of the present invention. In this embodiment, elements like those of the first embodiment are given like numerals. The port 1c, which communicates with the tandem master cylinder 10, is connected with a changeover valve 65, a 3-port, 2-position solenoid controlled valve, by the passage 71. The changeover valve 65 is respectively connected with the wheel cylinders 51a, 52a of front wheels 51, 52 through the charge and discharge valves 61, 62 and check valves 61a, 62a provided in parallel thereto.

The changeover valve 65 connects the charge and discharge valves 61, 62 to the port 1c when the changeover valve 65 is not actuated, and to the port 1g of pressure booster 20 through the passage 73 when it is actuated.

The charge and discharge valves 61, 62 are 3-port, 3-position solenoid controlled valves which connect the wheel cylinders 51a, 52a to the changeover valve 65 at a first position, which cut-off the wheel cylinders 51a, 52a at a second position, and which connect wheel cylinders 51a, 52a to the reservoir 41 at a third position. Normally, braking operations are conducted with the charge and discharge valves 61, 62 at the first positions, and one of the first through third positions is used for adjusting the brake fluid pressure during an anti-lock control operation.

In the same way, the charge and discharge valves 63, 64 and the check valves 63a, 64a provided in parallel to these valves are connected with the wheel cylinders 53a, 54a. However, the charge and discharge valves 63, 64 are connected with the port 1d by the passage 72 through the changeover valve 60a, and they are connected with the port 1g by the passage 73 through the changeover valve 60b.

The changeover valves 60a, 60b are 2-port, 2-position solenoid controlled valves. The former is normally closed, while the latter is normally open. Therefore, the charge and discharge valves 63, 64 and the check valves 63a, 64a are connected to the passage 73 when the changeover valves 60a, 60b are not activated. When the boost pressure is lower than a predetermined pressure, the changeover valves 60a, 60b are operated and the charge and discharge valves 63, 64 and the check valves 63a, 64a are connected to the passage 72.

The valves 60 to 65 are electrically controlled by a control circuit 90 during anti-lock control. For instance, the control circuit 90 receives a detection signal from the powered pressure detection sensor (not illustrated) and compares it with a predetermined pressure value, a solenoid drive signal is issued to excite the solenoids (not illustrated) of changeover valves 60a, 60b.

In the third embodiment, the changeover valves 65, 60a and 60b and charge and discharge valves 61 to 64 are set at the position indicated in FIG. 3 during ordinary braking operations. The braking operation is carried out for the front wheels 51, 52 by braking pressure supplied from the tandem master cylinder 10, and the braking operation is carried out for the rear wheels 53, 54 by powered pressure supplied from the pressure booster 20. During the braking operation, when a slip condition of the wheels is detected the anti-lock control starts. The changeover valves 65, 60a and 60b are operated by the control circuit 90, the boost pressure from pressure booster 20 is supplied to the charge and discharge valves 61 to 64 from the port 1g, and one of the three positions of each of the charge and discharge valves 61 to 64 is selected depending on the locked condition of rotation of the front and rear wheels 51 to 54, thereby increasing or decreasing the fluid pressure in the wheel cylinders 51a to 54a.

When such powered pressure is decreased for some reason, the changeover valves 65, 60a and 60b are operated by the control circuit 90 such that braking pressure is supplied to the front and rear wheels 51 to 54 from the tandem master cylinder 10. Therefore, this embodiment supplies powered braking force to all of the front and rear wheels and functions safely even when the powered pressure is decreased.

Figure 4:
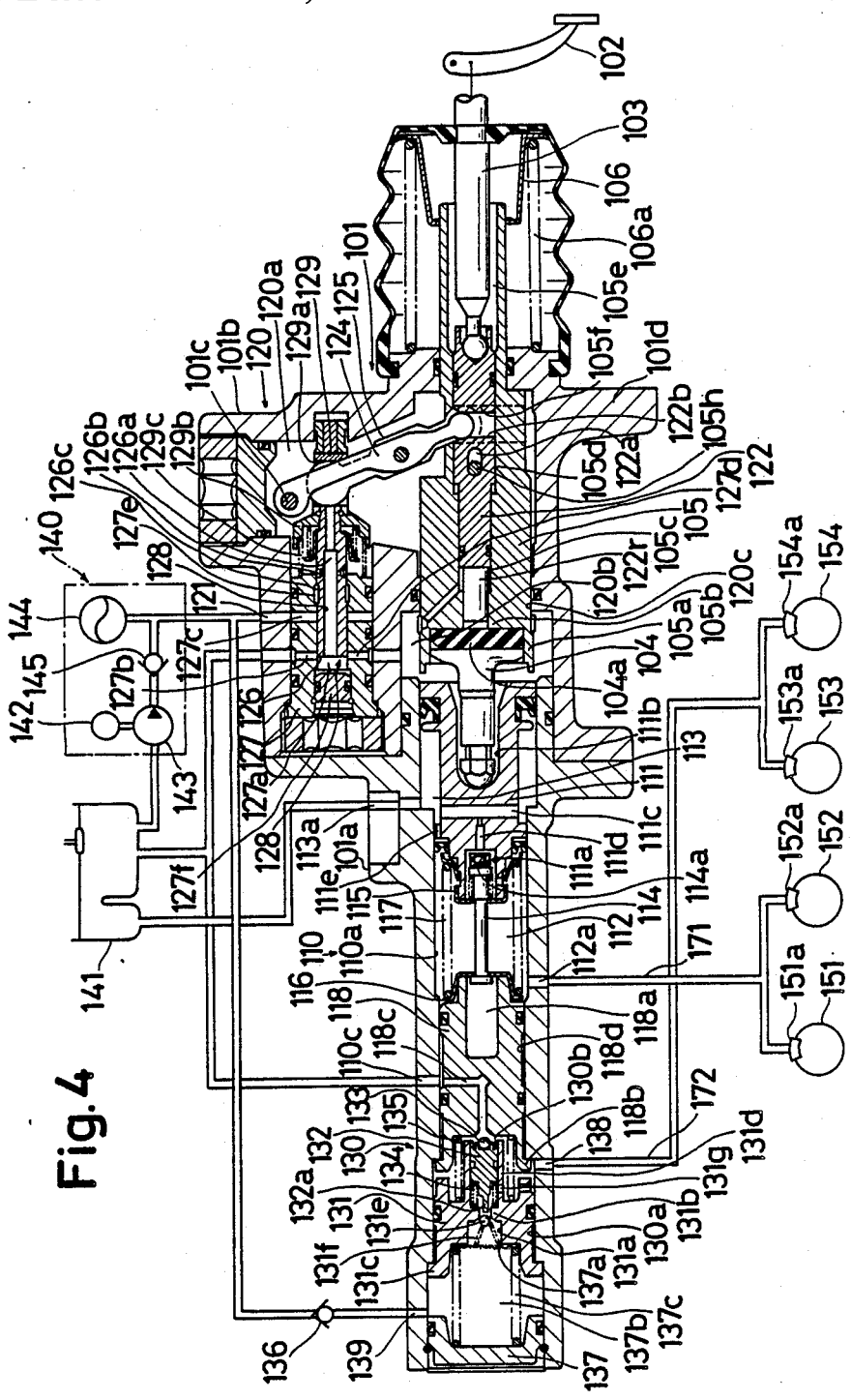
FIG. 4 is a cross-sectional view of a fourth embodiment of the hydraulic braking system of the present invention, including a schematic of the hydraulic circuitry thereof.

FIG. 4 shows a fourth embodiment of the present invention. The brake hydraulic pressure control system 101 comprises a master cylinder 110, a hydraulic pressure booster 120 and a regulator 130 which functions as a dynamic hydraulic pressure control system. The fourth embodiment functions such that a depressing force applied to the brake pedal 102 is transmitted as a braking operation force through the input rod 103. A braking pressure transmitted from a reservoir 141 or a powered hydraulic pressure source 140 depending on the braking force, is controlled and then output to wheel cylinders 151a to 154a of the front wheels 151, 152 and rear wheels 153, 154.

The master cylinder 110 includes, in series, the regulator 130 and a master cylinder piston (hereinafter referred to as master piston) 111, which is fluid-tightly and slidably inserted into the cylinder hole or passage 110a formed in the cylinder 110. The master piston 111 includes a small diameter part and a large diameter part and the cylinder hole 110a is stepped so that it includes a smaller diameter part and a larger diameter part so that the master piston is well fitted to the cylinder hole 110a. Within the larger diameter part of the cylinder hole 110a, a fluid supply chamber 113 is defined between the small diameter part and large diameter part of master piston 111. Within the smaller diameter part of cylinder hole 110a, a pressure chamber 112 is defined between the small diameter part of master piston 111 and a control piston 118. This pressure chamber 112 is connected to a fluid passage 171 through a port 112a and the fluid supply chamber 113 is connected to the reservoir 141 through a port 113a.

The control piston 118 is provided between the master piston 111 and the regulator 130 and has a diameter smaller than the cylinder hole 110a, so that it is fluid-tightly and slidably positioned in a communication hole or passage 118d connected to the cylinder hole 110a. A hole or passage 118a is formed axially in the control piston 118 in the end of the control piston 118 nearest the cylinder hole 110a, and a flange 118b formed on the outer circumference of the other end of the control piston 118 engages with a shoulder part of the communication hole 118d. Thereby, the control piston 118 cannot enter the cylinder hole 110a. A large diameter part of valve rod 114 is slidably accommodated in the hole 118a of control piston 118 and movement of the large diameter part of valve rod 114 toward the master piston 111 is restricted by a retainer 116.

The master piston 111 includes holes or passages 111a and 111b extending axially toward the center of the master piston 111 from both ends, and a hole or passage 111c extending radially therethrough. The hole 111a and hole 111c are connected by a small hole 111d formed axially in the master piston 111. Additionally, a hole 111e extends axially through an outer flange of the master piston 111. The end of pressure chamber 112 nearest the master piston 111 is covered with a cup seal and thereby a check valve is formed with the hole 111e. One end of the valve rod 114 is slidably accommodated within the hole 111a of the master piston 111, and movement thereof toward the control piston 118 is restricted by a retainer 115. The one end of valve rod 114 has a valve body 114a mounted thereon, such that the valve body 114a is axially aligned with the hole 111d. A head portion of an output rod 104 is accommodated within the hole 111b.

A return spring 117 extends between the retainers 115 and 116 and urges the retainers 115, 116 apart to separate the master piston 111 and the control piston 118. Therefore normally both ends of valve rod 114 abut against the retainers 115 and 116. The valve body 114a and small hole 111d are separated and the brake fluid supplied to the fluid supply chamber 113 from the reservoir 141 fills the pressure chamber 112 through the hole 111e, and the holes 111c, 111d, and 111a. When the master piston 111 is pressed toward the control piston 118 against the urging of the return spring 117, the hole 111e is blocked by the cup seal and the small hole 111d is blocked by the valve body 114a. The pressure chamber 112 is therefore tightly closed except for the output port 112a, and the brake fluid pressure in passage 171 is thereby increased through pressing of the master piston 111.

It is important to note that, as the master piston 111 slides to the left in FIG. 4, the control piston 118 also slides to the left, which will be explained later in detail with reference to the regulator 130.

The pressure booster 120 will next be explained together with the brake input mechanism.

A pressure multiplying chamber 120a and a low pressure chamber 120b are located in a housing 101b joined to the housing 101a, and a power piston 105 is fluid-tightly and slidably inserted into a hole or passage 120c which is substantially co-axial with the cylinder hole 110a and which connects the chambers 120a and 120b. The power piston 105 is urged toward the brake pedal 102 by a spring 106a which extends between the retainer 106 and the housing 101b. The retainer 106 is fixed to one end of the power piston 105. At an intermediate portion of power piston 105, a shoulder part is formed and contact of this shoulder part with the housing 101b limits sliding movement of the power piston 105 toward the brake pedal 102. A recess 105a is formed in the end of the power piston 105 nearest the master piston 111, and a stepped hole or passage is also formed axially in the same end of the power piston 105 in a radially central location. The stepped hole includes a small hole or passage 105b, intermediate hole or passage 105c, large hole or passage 105d and open hole or passage 105e. A reaction force rod 122r fits inside the small hole 105b and a reaction force piston 122 including a small diameter part and large diameter part fits within the intermediate hole 105c and large hole 105d. The reaction force piston 122, including the reaction force rod 122r, is therefore slidably accommodated in the stepped hole. The reaction force rod 122r has a longer length in the axial direction then the small hole 105b. An elongated hole or passage 122a having a longer axis in the axial direction, and a through hole or passage 122b orthogonal to the elongated hole 122a are bored radially through the reaction force piston 122. A pin 105h fixed to the power piston 105 extends into the elongated hole 122a, and sliding of the reaction force piston 122 at least in the direction of brake pedal 102 is thereby restricted relative to the power piston 105.

A ball bearing is formed at the end of the reaction force piston 122 opposite the reaction force rod 122r. A spherical head formed at the end of the input rod 103 fits within the ball bearing of reaction force piston 122 and is fixed therein by a projection formed on the internal surface of the bearing. A through hole or passage 105f having a diameter larger than the hole 122b is bored into the power piston 105 such that the through hole 105f overlaps the through hole 122b.

A ring-shaped space is formed between the inner surface of power piston 105 which defines the intermediate hole 105c, and the reaction rod 122r, due to the difference in length of the reaction rod 122r and small hole 105b. An oblique hole or passage 105g connects the ring-shaped space and the low pressure chamber 120b. A large diameter end of an output rod 104 and an elastic reaction disk 104a fit within the recess 105a of power piston 105, and they are fixed therein by a plate spring, for example, such that a gap is formed between the reaction disk 104a and the end of reaction rod 122r. The output rod 104 fits within the hole 111b of master piston 111 such that a head part of the output rod 104 is in contact with the bottom surface of hole 111b.

A spherical head of a supporting lever 124, of which one end is pivotally connected by the pin 101c to the housing 101b and which pivots within the pressure multiplying chamber 120a, fits within the hole 122b of reaction force piston 122. The supporting lever 124 and a first head part of a control lever 125 fit within the hole 105f of the power piston 105. The control level 125 is rotatably connected to the supporting lever 124 at substantially the center thereof by a pin 124a. Accordingly, when the reaction force piston 122 slides toward the output rod 104, supporting lever 124 is rotated clockwise around the pin 101c. Since the first head part of control lever 125 is held within the hole 105f of power piston 105, a second head part of control lever 125 rotates counterclockwise around the pin 124a until the reaction force piston 122r contacts reaction disk 104a.

A spool valve hole or passage connected to the pressure multiplying chamber 120a is formed in the housing 101b and a spool valve 128 is located therein. A spool 126 of the spool valve 128 is slidably accommodated within a spool hole or passage within a cylinder 127 which is substantially parallel to the power piston 105. One end of spool hole 127a is tightly closed by a plug body 127f.

A through hole or passage 126a extending axially, and a squeezing hole 126b extending radially are bored in the spool 126. One end of the spool 126 is located within the pressure multiplying chamber 120a and is coupled with one end of a control rod 129. The other end of control rod 129 is slidably supported by the housing 101b, and the second head part of control lever 125 fits within a through hole or passage 129a bored radially through the control rod 129.

A spring 129c extends between a retainer 129b supported at one end of control rod 129 and the cylinder 127, and the spool 126 is thereby urged toward the control lever 125. The hole 126a is always open to the pressure multiplying chamber 120a where one end of the spool 126 and control rod 129 are engaged.

The other end of hole 126a is connected, in the position shown in FIG. 4, with the reservoir 141 and the low pressure chamber 120b, through a hole or passage 127b and a hole or passage bored radially through the cylinder 127, and by a port provided in the housing 101b. The reservoir 141 and the low pressure chamber 120b are also always connected by a circumferential groove extending around the cylinder 127 adjacent holes 127b and 127d. Additionally, in the position shown in FIG. 4, the interior of pressure multiplying chamber 120a is connected with the reservoir 141 through the holes 127b and 126a, and is filled with brake fluid under atmospheric pressure.

A hole or passage 127c connected to the powered pressure source 140 is bored into the cylinder 127 at a predetermined distance from the hole 127b, but this hole is blocked in the position of FIG. 4 by the circumferential surface of spool 126. A ring-shaped groove 127c is formed in the cylinder 127 between the hole 127c and the end face of the spool 126, and a ring-shaped groove 126c is formed in the external circumference of spool 126 opposite the groove 127e.

When the spool 126 slides toward the plug body 127f as a result of movement of the control lever 25, the hole 127b of cylinder 127 is blocked, the groove 126c moves to a position opposite both the hole 27c and the ring shaped groove 127e, and the squeezing hole 126b moves to a position opposite the ring shaped groove 127e. Thereby, the powered hydraulic pressure source 140 is connected to the pressure multiplying chamber 120a through the hole 126a.

Powered pressure from powered hydraulic pressure source 140 is thereby transmitted into the pressure multiplying chamber 120a, boosting the pressure therein and transmitting a reaction force to the brake pedal 102 from the reaction force piston 122. Simultaneously, the boosted fluid pressure is transmitted to the master piston 111 through the power piston 105. As the brake pedal 102 is actuated, the power piston 105 moves with the reaction force piston 122 until the pin 105h engages with the elongated hole 122a. Thereafter, the control lever 125 relatively rotates clockwise and the control rod 129 is drawn back to the right in FIG. 4. The hole 127c of cylinder 127 is thereby blocked and the hole 127b is connected to the hole 126a of spool 126, so that the pressure within the pressure multiplying chamber 120a is lowered and the power piston 105 moves toward the brake pedal 102.

In this embodiment, a hydraulic pressure type booster is used but an under pressure type booster may also be used.

Next, the regulator 130 and the control piston 118 in the housing 101a will be explained.

The regulator 130 controls, in cooperation with the control piston 118, powered pressure supplied from the powered hydraulic pressure source 140 to keep the pressure in a regulator chamber 130b almost equal to the pressure within the pressure chamber 112.

A regulator piston 131 is slidable within a regulator hole or passage 130a formed in the housing 101a. The regulator piston 131 and the control piston 118 together form a regulator chamber 130b, which is connected to a passage 172 through a port 138. Also, a communication hole or passage 118c is formed in the control piston 118. One end thereof opens into the regulator chamber 130b and the other end thereof opens to an external circumferential groove in the control piston 118. This external circumferential groove is always connected to the port 110c which is connected to the reservoir 141. Therefore, the regulator chamber 130b is always connected to the reservoir 141 through the communication hole 118c.

A flange 131c is formed at one end of the regulator piston 131 and it engages with a stepped portion of the regulator hole 130a, and thereby limits movement of the regulator piston 131 toward the control piston 118. A recess 131a and a communication hole or passage 131b connected thereto are bored axially into the regulator piston 131, and they are connected to the regulator chamber 130b via a hole or passage 131g. Within the recess 131a, a spherical valve body 131e is disposed to open and close the small hole 131b. The spherical valve body 131e is urged toward a position blocking the small hole 131b by a spring 131f which extends between the valve body 131e and a retainer 137a. A cylindrical part 131d is formed on one end of regulator piston 131, and a spring 135 extends around the cylindrical part 131d between the regulator piston 131 and control piston 118 to thereby urge the control piston 118 toward the master cylinder 110. A plunger 132 is slidably positioned inside the cylindrical part 131d, and it is urged toward the control piston 118 by a spring 134 which is fixed to the regulator piston 131. An elongated projection 132a having a diameter smaller than the hole 131b is formed at the end of plunger 132 nearest the hole 131b, and a valve body 133 is fixed to the end of the plunger 132 nearest the open end of the communication hole 118c in control piston 118. Therefore, the interior of cylindrical part 131d is separated into two spaces by the plunger 132, and the spaces are connected to each other by the through hole 131g provided in the cylindrical part 131d.

The end face of the regulator piston 131 on the side of recess 131a and a plug body 137 which closes the regulator hole 130a together form a powered hydraulic pressure chamber 137b. The powered hydraulic pressure chamber 137b is connected to the powered hydraulic pressure source 140 by a port 139 through a check valve 136. Therefore, brake fluid under powered pressure from the powered hydraulic pressure source 140 is transmitted to the powered pressure chamber 137b, but reverse transmission of pressured brake fluid is blocked. A spring 137c extends between the retainer 137a on the regulator piston 131, and the plug body 137, and thereby urges the regulator piston 131 toward the control piston 118. The regulator piston 131 is thus always kept in the position indicated in FIG. 4 and the powered hydraulic pressure chamber 137b is kept filled with the pressurized brake fluid. The regulator 130 and the check valve 136 constitute a changeover means of the present invention.

The powered hydraulic pressure source 140 is provided with a hydraulic pressure pump 143 to be driven by an electric motor 142, and the input side thereof is connected to the reservoir 141 while the output side is connected to the accumulator 144 through the check valve 145. Powered hydraulic pressure is applied to the necessary areas through the accumulator 144.

The operation of this embodiment is explained hereunder. FIG. 4 shows the condition of the hydraulic brake system when the brake pedal 102 is not depressed. The pressure chamber 112 and the fluid supply chamber 113 are connected to each other, the wheel cylinders 151a, 152a of front wheels 151, 152, and the reservoir 141. Therefore the pressure of the brake fluid filling the chambers 112, 113 is equal to the pressure within the reservoir 141, which is generally atmospheric pressure.

Meanwhile, brake fluid under powered pressure from the powered hydraulic pressure source 140 is applied to the port 121 of hydraulic pressure booster 120 and is also applied to the port 139 of regulator 130 through the check valve 136. However, the hydraulic pressure booster 120 does not function under this condition.

The flange part 118b of the control piston 118 is urged into contact with a shoulder part of a communication hole or passage 118d by the spring 135. In this position, the communication hole 118c of the control piston 188 is connected to the regulator chamber 130b and the valve body 131e blocks the small hole 131b. Therefore, the brake fluid within the regulator chamber 130b is under the same pressure as the reservoir 141, i.e., generally atmospheric pressure. When a force is applied to the brake pedal 102 to rotate the brake pedal 102 clockwise in FIG. 4, the pressure booster 120 operates through the input rod 103, the reaction force piston 122, the power piston 105, and the control lever 125. Also, a force urging the master piston 111 toward the regulator 130 is transmitted to the master piston 111 through the output rod 104 and the master piston 111 slides toward the regulator 130. Thereby, a force is applied to the control piston 118 by the return spring 117 urging the control piston 118 toward the regulator 130, the communication hole 118c is blocked by the valve body 133 when the control piston 118 contacts the plunger 132, and the valve body 131e is moved to the left in FIG. 4 by the elongated projection 132a as the plunger 132 is pressed leftward in FIG. 4 to thereby open the small hole 131b. Accordingly, brake fluid under powered pressure is supplied to the regulator chamber 130b from the powered hydraulic pressure chamber 137b, and from there is transmitted to the wheel cylinders 153a and 154a to apply powered braking force to the rear wheels 153 and 154. Simultaneously, the valve body 114a blocks the small hole 111d so that the pressure chamber 112 is tightly closed, and brake fluid under pressure due to the reduction in volume of the pressure chamber 112 is output from the port 112a to braking force to the front wheels 151, 152.

When the pressure within the regulator chamber 130b exceeds the pressure in pressure chamber 112, the control piston 118 is pressed toward the master piston 111. Thereby, the plunger 132 separates from the valve body 131e, the small hole 131b is blocked by the valve body 131e, and the communication hole 118c separates from the valve body 133 and opens. Therefore, the regulator chamber 130b is again connected to the reservoir 141, lowering the fluid pressure inside the regulator chamber 130b. When the pressure within the rgulator chamber 130b becomes lower than the pressure within pressure chamber 112, the control piston 118 again slides toward the regulator 130 with the same results as explained previously. The pressure in the regulator chamber 130b is thus controlled to a regulator pressure which is almost equal to the pressure applied to the control piston 118 by the above described events. When hydraulic pressure in the pressure chamber 112 increases through sliding of the master piston 111 to the left in FIG. 4, the valve rod 114 slides within the hole 118a. The fluid within the regulator chamber 130b and the fluid in the pressure chamber 112 are kept separate by the seal of control piston 118, and thus the pressures in the chambers 130b, 112 can be completely independent of each other (except for the effect of the difference of the urging forces of return spring 117 and spring 135), but the pressures are kept balanced by the above described events. The braking force is released by an operation which is the reverse of that explained above.

Next, when the powered hydraulic pressure source 140 stops for some reason and the supplied powered pressure is therefore decreased, neither the hydraulic pressure booster 120 nor the regulator 130 functions. When the master piston 111 is pressed toward the regulator 130, the open end of the communication hole 118c contacts the valve body 133, and thereby closes the connection between the regulator chamber 130b and the reservoir 141. Therefore, when the small hole 131b is opened, the powered hydraulic pressure chamber 137b, regulator chamber 130b and wheel cylinders 153a, 154a in the down-stream side of the check valve 136 are all brought to the same pressure.

When the master piston 111 is further pressed under this condition, the brake fluid pressure in the powered hydraulic pressure chamber 137b and regulator chamber 130b increases until the flange 131c of regulator piston 131 contacts the surface of plug body 137. Accordingly, even when the powered hydraulic pressure is decreased, the master cylinder 110 and the regulator 130 operate like a tandem master cylinder and brake fluid pressure is applied to both the front wheels 151, 152 and the rear wheels 153, 154.

Figure 5:
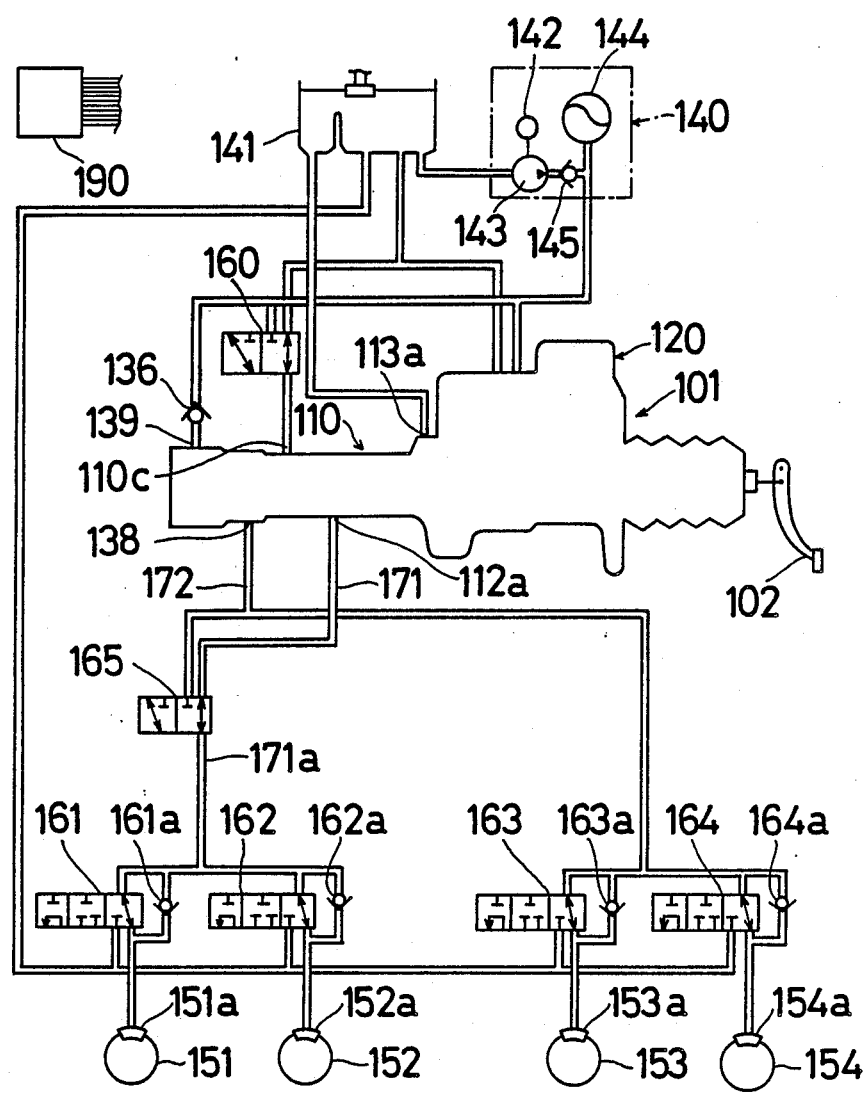
FIG. 5 is a schematic representation of a fifth embodiment of the hydraulic braking system of the present invention.

FIG. 5 shows a fifth embodiment of the present invention which adds anti-lock and anti-slip control functions to the embodiment of FIG. 4.

The elements like those of FIG. 4 are given like numerals and are not further explained hereinafter.

The port 112a connected to the pressure chamber 112 is connected, by the passages 171, 171a, to a changeover valve 165, which is a 3-port, 2-position solenoid controlled valve. The changeover valve 165 is connected respectively to the wheel cylinders 151a, 152a of the front wheels 151, 152 through charge and discharge valves 161, 162, and check valves 161a, 162a provided in parallel therewith. The changeover valve 165 allows, when it is not activated, the charge and discharge valves 161, 162 to communicate with the port 112a or allows, when it is activated, the valves to communicate with the port 138 of regulator 130 through the passage 172.

The charge/discharge valves 161, 162 are 3-port, 3-position solenoid controlled valves which allow the wheel cylinders 151a, 152a to communicate with the changeover valve 165 at a first position, which cutoff the communication at a second position, and which allow the wheel cylinders 151a, 152a to communicate with the reservoir 141 at a third position. Therefore, ordinary braking operations are carried out at the first position, and the brake fluid pressure is adjusted during an anti-lock control operation by selecting one of the first to third positions.

The wheel cylinders 153a, 154a of the rear wheels 153, 154 are connected to the charge/discharge valves 163, 164 and check valves 163a, 164a provided in parallel with the valves 163, 164, which operate similarly to the valves 161, 162. Also, the passage connecting the reservoir 141 and port 110c includes a normally-open changeover valve 160, which connects the reservoir 141 and the port 110c when it is not operated and which connects the powered hydraulic pressure source 140 and port 110c when it is operated. The changeover valve 160 is a 3-port, 2-position solenoid controlled valve which is usually set in the condition indicated in FIG. 5 and is then set to its other position during an anti-slip operation in order to prevent slip of the wheels. The changeover valves 160 and 165 are electrically controlled by a control circuit 90 which simultaneously controls the charge/discharge valves 161 to 164 during the anti-lock and anti-slip control operations.

In this embodiment, the changeover valves 160, 165 and charge/discharge valves 161 to 164 are normally set to the position indicated in FIG. 5. Braking of the front wheels 151, 152 is carried out by brake fluid pressure supplied from the pressure chamber 112, while braking of the rear wheels 153, 154 is carried out with regulator hydraulic pressure supplied from the regulator 130.

When an anti-lock control operation starts after a slip condition of the wheels is detected during braking, the changeover valve 165 is operated by the control circuit 190, the regulator hydraulic pressure of regulator 130 is supplied to the charge/discharge valves 161 to 164 from the port 138, one of the three positions of each charge/discharge valve 161 to 164 is selected depending on the lock condition of each wheel, and the pressure in the wheel cylinders 151a to 154a is thereby adjusted.

When the drive wheels, the rear wheels 153, 154 in this embodiment, slip during a start or acceleration, the changeover valve 160 is operated by the control circuit 190 and powered hydraulic pressure is supplied from the powered hydraulic pressure source 140 to the wheel cylinder 153 through the port 110c, the communication hole 118c of control piston 118, the regulator chamber 130b and the port 138. Regardless of the operation of the brake pedal, a braking force is thereby applied to the rear wheels 153, 154 while the charge/discharge valves 163, 164 are controlled, such that a desirable driving force is obtained. If powered pressure is decreased for some reason, the changeover valves 160 and 165 are set to the normal position by the control circuit 190 and the braking operation to the front and rear wheels 151 to 154 is carried out by brake fluid pressure supplied from the master cylinder 110 acting as a standard tandem master cylinder.

Therefore, braking force can be maintained in this embodiment to all of the front and rear wheels even when powered pressure is decreased, and this embodiment therefore functions effectively as the fail safe system.

Figure 6:
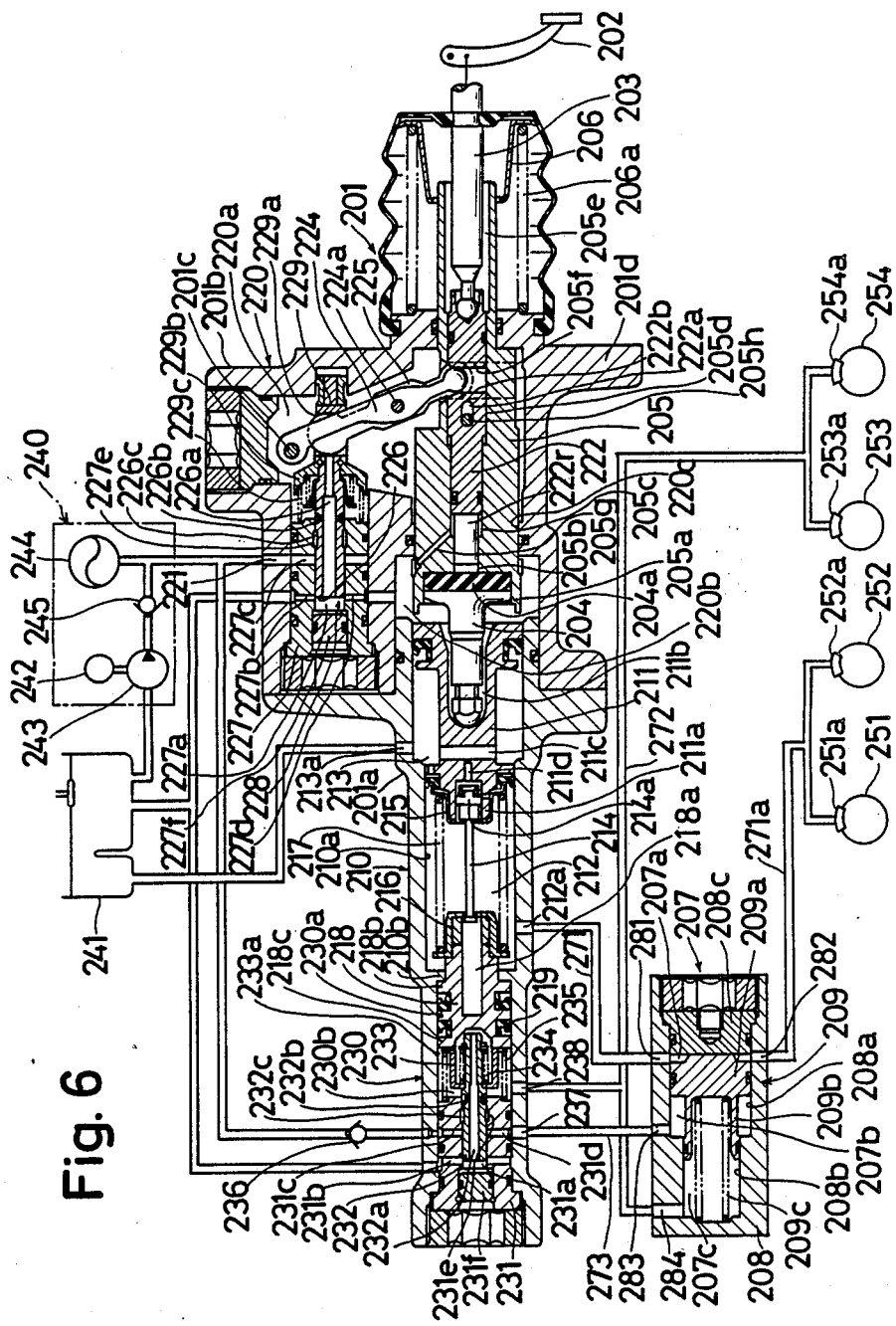
FIG. 6 is a cross-sectional view of a sixth embodiment of the hydraulic braking system of the present invention, including a schematic of the hydraulic circuitry thereof.

FIG. 6 shows a sixth embodiment of the present invention. The braking hydraulic pressure control system 201 comprises a master cylinder 210, a hydraulic pressure booster 220 and a regulator 230, which is a dynamic hydraulic pressure control system. According to this embodiment, a depressing force applied to the brake pedal 202 is transmitted through an input rod 203. A hydraulic pressure transmitted from reservoir 241 or from powered hydraulic pressure source 240 is controlled depending on the aforesaid force. Thereby, braking pressure is transmitted to the wheel cylinders 251a to 254a of front wheels 251, 252 and rear wheels 253, 254.

The master cylinder 210 includes therein the regulator 230 and a master cylinder piston (hereinafter referred to as master piston) 211 which is fluid-tightly and slidably positioned within the cylinder hole or passage 210a formed in the housing 210. The master piston 211 has a small diameter part and a large diameter part, and the cylinder hole 210a is a stepped hole having a smaller diameter part and a larger diameter part so that the master piston 211 is well fitted therein. A fluid supply chamber 213 is defined between the small diameter part and the large diameter part of the master piston 211 within the larger diameter part of the cylinder 210a. A pressure chamber 212 is defined between the small diameter part of master piston 211 and a control piston 218 within the smaller diameter part of the cylinder hole 210a. This pressure chamber 212 is connected to the passage 271 by a part 212a, and the fluid supply chamber 213 is connected to the reservoir 241 by a port 231a.

The control piston 218 is provided between the master piston 211 and the regulator 230 and is fluid-tightly and slidably positioned within a regulator hole 230a connected to the cylinder hole 210a. A hole or passage 218a is formed axially in the end of the control piston 218 nearest the cylinder hole 210a. A flange 218b formed on the external circumferential surface of the control piston 218 engages with a projecting part 210b formed between the cylinder hole 210a and the regulator hole 230a to limit movement of the control piston 218 toward the master piston 211. A large diameter part of a valve rod 214 is slidably accommodated within the hole 218a of control piston 218 and movement of the large diameter part of the valve rod 214 is limited in the direction of the master piston 211 by a retainer 216.

Holes or passages 211a and 211b are formed axially in the master piston 211 from both ends toward the center thereof, and a hole or passage 211c is formed radially therethrough. The hole 211a and the hole 211c are connected to each other by a small hole or passage 211d formed axially in the master piston 211. One end of the valve rod 214 is slidably positioned within the hole 211a of master piston 211, and movement of the valve rod 214 toward the control piston 218 is restricted by a retainer 215. The one end of the valve rod 214 includes a valve body 214a mounted thereon adjacent the small hole 211d.

A return spring 217 extends between the retainers 215 and 216, and thereby urges the master piston 211 and the control piston 218 apart such that both ends of the valve rod 214 are normally held against further movement out of the holes 211a, 218a by the retainers 215 and 216. Thus, the valve body 214a is normally spaced from the small hole 211d, and brake fluid supplied from the reservoir 241 through the fluid supply chamber 213 and the small hole 213a is supplied to the pressure chamber 212 through the hole 211c, small hole 211d and hole 211a of the master piston 211.

However, when the master piston 211 is pressed toward the control piston 218 against the urging of the return spring 217, the valve body 214a blocks the small hole 211d, and the pressure chamber 212 is tightly closed except for an output port 212a. Thereby, the brake fluid pressure within the pressure chamber 212 increases with further movement of master piston 211 toward the control piston 218. The control piston 218 also moves to the left in FIG. 6 with movement of master piston 211, as will be explained later in detail with reference to the regulator 230.

The hydraulic pressure booster 220 drives the master cylinder 210 and the regulator 230 provided in series thereto, with multiplied force, in response to actuation of the brake pedal 202. Powered hydraulic pressure transmitted from the powered hydraulic pressure source 240 through the port 221 is used to supply the boost pressure to a pressure multiplying chamber 220a. The structure and function of the hydraulic pressure booster 220 is the same in this embodiment as the hydraulic pressure booster 120 of FIG. 4, and therefore will not be explained again.

The regulator 230 which is located adjacent the master cylinder 210 will now be explained.

The basic structure of regulator 230 is substantially the same as the spool valve 228 of the hydraulic pressure booster 220, but powered hydraulic pressure supplied from the powered hydraulic pressure source 240 is controlled such that the pressure in a regulator chamber 230b of the regulator 230 is almost equal to the pressure in the pressure chamber 212 of master cylinder 210, and that pressure is transmitted as the hydraulic pressure of the regulator 230.

A cylinder 231 is positioned within a regulator hole or passage 230a within the housing 201a, and a spool 232 is slidably positioned within a spool hole or passage which is formed within the cylinder 231 on the same axis as the axis on which the master piston 211 slides. One end part of spool hole 231a is tightly closed by a plug body 231f. Within the regulator hole 230a, the regulator chamber 230b is formed between the cylinder 231 and the control piston 218 and it is connected to an external passage through a port 238.

A hole or passage 232a is formed axially through the spool 232, and a squeezing hole or passage is formed radially through the spool 232 such that it is connected to the hole 232a. One end of the spool 232 is located within the regulatory chamber 230b such that one end of the hole 232a may be open to the regulatory chamber 230b. A retainer 233 is fixed to the spool 232 at a stepped portion near the middle of the spool 232, and the retainer is urged toward the stepped portion of the spool 232 by a spring 234 fixed at the end of the spool 232 nearest the control piston 218. A spring 235 extends between a flange 233a on the retainer 233, and the cylinder 231, and the retainer 233 and the spool 232 are thereby urged toward the control piston 218.

The flange 233a of retainer 233 is urged into contact with the flange 218c of control piston 218 by the spring 235, and the flange 218b of control piston 218 is thereby normally urged into contact with the projecting part 210b of the cylinder 210a. In this position, 232a of spool 232 is connected to the reservoir 241 through a hole or passage 231b bored radially through the cylinder 231 and a port provided in the housing 201a adjacent to the hole 231b. Therefore, brake fluid in the regulator chamber 230b is normally under atmospheric pressure from the reservoir 241.

The cylinder 231 is provided with a hole or passage 231c which is connected, through the check valve 236, to the powered hydraulic pressure source 240. Normally, the passage 231c is blocked by the circumferential surface of spool 232. Also, a hole or passage 231d is provided in the cylinder 231 such that it is connected with the hole 231b via an external circumferential groove in cylinder 231. The groove in cylinder 231 is also connected to a port 237 in the casing 201a.

A ring-shaped groove 231e is formed in the cylinder 231 between the holes 231c, 231d and the end of the spool 232 nearest the control piston 218, and a ring-shaped groove 232c is formed at the external circumference of the spool 232 such that it is adjacent the ring shaped groove 231e in the cylinder 231.

When the spool 232 moves with the retainer 233 through movement of the control piston 218 such that it slides toward the plug body 231f, the hole 231b in the cylinder 231 becomes blocked, the groove 232c moves to a position adjacent the holes 231c, 231d and the groove 231e, and the squeezing hole 232b moves to a position adjacent to groove 231e such that the holes 231c, 231d are connected to the hole 232a. Powered hydraulic pressure from powered hydraulic pressure source 240 is thus transmitted to the regulator chamber 230b and thereby moves the control piston 218 away from the cylinder 231. Then, the holes 231c, 231d of the cylinder 231 are blocked and the hole 231b is connected to the hole 232a of spool 232, the hydraulic pressure in the regulator chamber 230b is lowered, and when the pressure applied from the pressure chamber 212 to the control piston 218 exceeds such hydraulic pressure, the control piston 218 moves back toward the regulator 230. The hydraulic pressure in the regulator chamber 230b is thus kept at a regulator hydraulic pressure which is almost equal to the pressure applied to the control piston 218 from the pressure chamber 212.

The powered hydraulic pressure source 240 is provided with a hydraulic pump 243 which is driven by an electrical motor 242. The input side thereof is connected to the reservoir 241 while the output side thereof is connected to an accumulator 244 through a check valve 245. Powered hydraulic pressure is supplied as required by the accumulator 244.

An auxiliary hydraulic pressure control system 207, which functions as a changeover means in this embodiment, includes a cylinder 208 and a piston 209 which slides within the cylinder 208. The auxiliary hydraulic pressure control system 207 is arranged between the hydraulic pressure control system 201 and the wheel cylinders 251 to 254, and is mounted to a flange 201b of housing 210. The cylinder 208 is provided with a cylinder hole or passage having a stepped portion including a larger diameter part 208a and a smaller diameter part 208b. The piston 209 comprises a cylindrical skirt portion 209b which is fluid-tightly and slidably positioned within the smaller diameter part 208b of the cylinder hole, and a head part 209a which is fluid-tightly and slidably positioned within the larger diameter part 208a of the cylinder hole.

The large diameter part 208a of the cylinder hole is tightly blocked by a plug body 208c such that a first pressure chamber 207a is formed between the plug body 208c and the head part 209a of piston 209. A port 281 is connected to the first pressure chamber 207a and the passage 271, which is connected to the port 212a of master cylinder 210. Therefore, brake hydraulic pressure in the pressure chamber 212 is transmitted to the first pressure chamber 207a. A port 282 is connected to a passage 271a which is connected to the wheel cylinders 251a, 242a of front wheels 251, 252. A control chamber 207b is formed between the larger diameter part 208a of the cylinder hole, and the skirt portion 209b of the piston 209. The control chamber 207b is connected to the port 237 of regulator 230 by a port 283 and a passage 273 and therefore powered hydraulic pressure is always transmitted to the control chamber 207b from the accumulator 244.

Also, a second pressure chamber 207c is formed between the smaller diameter part 208b of the cylinder hole and the skirt portion 209b of the piston 209. A passage 272 connecting the port 238 of the regulator 230 and the wheel cylinders 253a, 254a of rear wheels 253, 254 is also connected to the second pressure chamber 207c through a port 284. Therefore, the regulator pressure output from the regulator 230 is transmitted to the second pressure chamber 207c. A spring 209c extends between the head 209a and an end of the cylinder 208. The piston 209 is thereby urged in to contact with the plug body 208c. However, as is apparent from the pressure relation within the cylinder 208, the piston 209 will remain in the position in which the head part 209a is in contact with the plug body 208c only as long as powered pressure from the powered hydraulic pressure source 240 is not decreased.

The operation of the sixth embodiment of the present invention is explained hereunder. FIG. 6 indicates a condition wherein the brake pedal 202 is not actuated. The pressure chamber 212 of master cylinder 210 is in communication with the fluid supply chamber 213, the wheel cylinders 251a, 252a of front wheels 251, 252, and the reservoir 241. Therefore, the brake fluid within the chamber 212 and the wheel cylinders 251a, 252a is at a pressure which is equal to the pressure within the reservoir 241, namely almost atmospheric pressure.

On the other hand, powered hydraulic pressure from the powered hydraulic pressure source 241 is transmitted to the hole 231c of the regulator 230 and the hole 227c of the pressure booster 220. In this condition, the pressure booster 220 does not function since the hole 227c is blocked, but the hole 231c of regulator 230 is connected to the hole 231d through the ring-shaped groove and powered pressure is applied to the control chamber 207b from the port 237 through the port 283 of auxiliary hydraulic pressure control system 207.

Since the brake fluid in the regulator chamber 230b is in communication with the reservoir 241 through the hole 231b and is therefore at a pressure almost equal to atmospheric pressure, the brake fluid in the wheel cylinders 253a, 254a, and the second pressure chamber 207c are also under near-atmospheric pressure. Accordingly, the first and second pressure chambers 207a and 207c are under the same pressure, so the piston 209 is urged toward the plug body 208c by the spring 209c and the powered pressure within the control chamber 207b.

When the brake pedal 202 is depressed, a reaction piston 222 is pressed through an input rod 203 and a reaction rod 222r moves until it contacts a reaction disk 204a of a power piston 205. Thereby, a control lever 225 rotates counterclockwise about a supporting lever 224, thereby pressing a spool 225 leftward in FIG. 6 with a head part of the control lever 225. Accordingly, as explained previously, powered pressure is transmitted from the powered hydraulic pressure source 240, and the power piston 205 is pressed leftward in FIG. 6 to transmit the multiplied power to the master piston 211 and transmit a reaction force to the brake pedal 202 through the reaction piston 222. Within a pressure multiplying chamber 220a, powered hydraulic pressure is maintained at a predetermined pressure (boost pressure) by relative displacement between the power piston 205 and the reaction piston 222, and a resultant leftward movement of a spool valve 228 due to movement of the control lever 225.

The pressing force of power piston 205 toward the master piston 211 is transmitted to the master piston 211 through an output rod 204 as the power piston 205 slides toward the regulator 230. Thereby, the pressing force is applied to the control piston 218 through the return spring 217, and the spool 232 is pushed leftward in FIG. 6. Powered hydraulic pressure is thus supplied to the regulator chamber 230b from the hole 231c and from there to the wheel cylinders 253a, 254a and the auxiliary hydraulic pressure control system 207. Braking force is thereby applied to the rear wheels 253, 254. Simultaneously, the valve body 214a blocks the small hole 211d and the pressure chamber 212 becomes tightly closed. As the volume of the pressure chamber 212 is reduced by movement of the master piston 211 toward the regulator 230, the brake fluid pressure in pressure chamber 212 increases and is transmitted from the port 212a to the wheel cylinders 251a, 252a. Braking force is thereby applied to the front wheels 251, 252.

As the pressure in the pressure chamber 212 increases with leftward sliding of the master piston 211, the valve rod 214 slides within the hole 218a and the fluid in the regulator chamber 230b and the fluid in the pressure chamber 212 are separated by a seal 219 between both flanges 218b, 218c of the control piston 218. Thus, the pressures in the pressure chamber 212 and the regulator chamber 230b may be independent of each other (except for the energizing force difference of return spring 217 and spring 235), but they are balanced by the movements of control piston 218 described above. Therefore, when the pressure in the pressure chamber 212 increases, the spool 232 moves toward the plug body 231f and thus, introduces powered hydraulic pressure into the regulator chamber 230b and boosts the pressure inside the regulator chamber 230b. However, when the pressure inside the regulator chamber 230b increases so that it is larger than the pressure in pressure chamber 212, the spool 232 moves backward, thereby connecting the pressure inside regulator chamber 230b with the reservoir 241. Thereby, the regulator pressure increases and decreases until the pressure in both chambers is generally equal. The braking force is released by a set of events in reverse of the events explained above.

When the powered hydraulic pressure source 240 stops operation for some reason and the powered hydraulic pressure is decreased, neither the pressure booster 220 nor the regulator 230 functions. When the master piston 211 is then pressed toward the regulator 230 through the brake pedal 202, the spool 232 is pushed into contact with the plug body 231f, thus blocking off connection with the reservoir 241.

Therefore, the pressures within the elements connected to the regulator chamber 230b in the downstream side of the check valve, i.e., the control chamber 207b, the second pressure chamber 207c and the wheel cylinders 253a, 254a are all lowered to the same pressure.

When the master piston 211 is further pressed in this condition, the braking pressure in the pressure chamber 212 is transmitted to the first pressure chamber 207a of the auxiliary hydraulic pressure control system 207 and thereby the piston 209 is caused to slide toward the left in FIG. 6. Thereby, the brake fluid pressure in the control chamber 207b, the second pressure chamber 207c, and the wheel cylinders 253a, 254a increases until the piston 209 contacts the inner-end of cylinder 208. Thus, even when the powered pressure is decreased, braking force is applied not only to the front wheels 251, 252, but also to the rear wheels 253, 254 by means of the master cylinder 210 and auxiliary hydraulic pressure control system 207.

It should be noted that an under pressure type booster may be used in place of the booster disclosed for use in the sixth embodiment.

Figure 7:
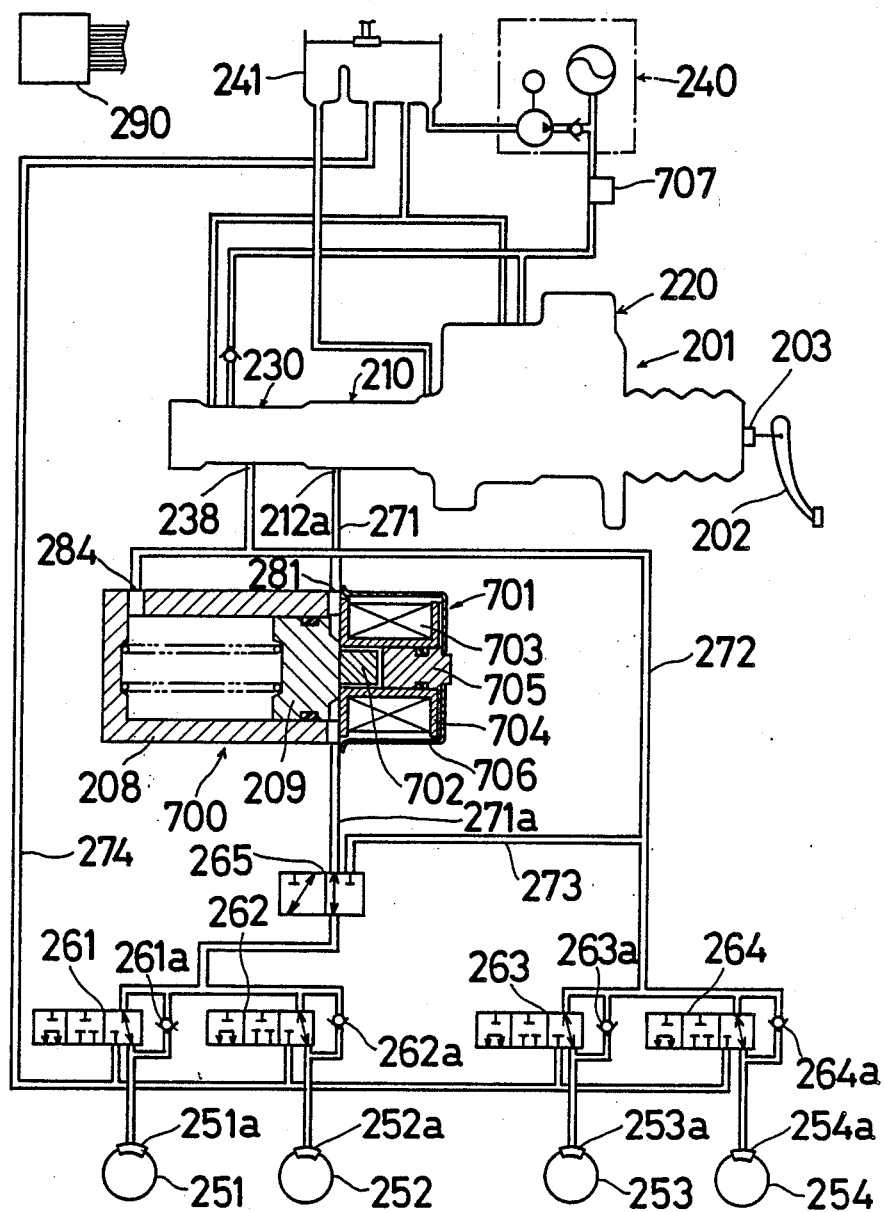
FIG. 7 is a schematic representation of a seventh embodiment of the hydraulic braking system of the present invention.

FIG. 7 shows a seventh embodiment of the present invention, in which an anti-lock control function is added to the sixth embodiment and in which the auxiliary hydraulic pressure control system of the sixth embodiment is driven by an electrical control.

Elements like those of FIG. 6 are given like numerals and are not explained further.

An auxiliary hydraulic pressure control system 700 of the present invention mounts a solenoid 701 at the open end of cylinder 208, and a plunger 702 is fixed to the piston 209. This plunger 702 is surrounded by a bobbin 704 having wound thereon a solenoid coil 703, and a stator 705 is fixed to a case 706 opposite the plunger 702. The solenoid coil 703 is connected to a control circuit 290. Also, hydraulic pressure detection sensor 707 adjacent the powered hydraulic pressure source 240 is connected to the control circuit 290. In comparison with FIG. 6, the cylinder hole of cylinder 208 is formed with a single inner diameter, the piston 209 is formed without a skirt portion 209, and the cylinder 208 is formed without a port 283.

The port 212a connected to the pressure chamber 212 is connected to a 3-port, 2-position solenoid controlled valve, changeover valve 265, through the auxiliary hydraulic pressure control system 700 by passages 271, 271a. The changeover valve 265 is respectively connected to the wheel cylinders 251a, 252a of the front wheels 251, 252 through charge/discharge valves 261, 262 and check valves 261a, 262a disposed in parallel with the charge/discharge valves 261, 262. The changeover valve 265 allows the charge/discharge valves 261, 262 to communicate with the port 212a when the changeover valve 265 is not actuated, and allows the valves to communicate with the port 238 of regulator 230 through a passage 273 when the changeover valve is actuated.

The charge/discharge valves 261, 262 are 3-port, 3-position solenoid controlled valves, which allow the wheel cylinders 251a, 252a to communicate with the changeover valve 265 at a first position, which cut off the cylinders 251a, 252a at a second position and which allow the cylinders 251a, 252a to communicate with the reservoir 241 at a third position. Usually, these valves are set to the first position during ordinary braking operations. During an anti-lock control operation, one of the first through third positions is selected by the control circuit 290 to adjust the brake fluid pressure and to thereby apply a desirable braking force to the wheels 251, 252.

For the rear wheels 253, 254, the wheel cylinders 253a, 254a are connected to charge/discharge valves 263, 264, and these charge/discharge valves are connected to the port 238 by a passage 272.

The changeover valve 265 is also electrically controlled by the control circuit 290 during the anti-lock control operation. The control circuit 290 receives a detection signal from the hydraulic pressure detection sensor 707 and compares it with a predetermined pressure. When the detection signal is under the predetermined pressure, the solenoid drive signal is output and thereby the solenoid (not illustrated) of changeover valve 265 is activated.

In this embodiment, during ordinary braking operations, when it is judged by the control circuit 290 that the predetermined powered pressure exists, the solenoid coil 703 of the auxiliary hydraulic pressure control system 700 is activated and the plunger 702 is attracted by the stator 705 and is kept in the position shown in FIG. 7. As long as the changeover valve 265 and the charge/discharge valves 261 to 264 are set in the positions indicated in FIG. 7, braking of the front wheels 251, 252 is achieved with brake fluid pressure supplied from the pressure chamber 212, and braking of the rear wheels 253, 254 is achieved with brake fluid pressure supplied from the regulator 230.

However, when the wheels begin to slip during braking, an anti-lock control operation starts. The changeover valve 265 is then operated by the control circuit 290 such that regulator hydraulic pressure from the regulator 230 is supplied to the charge/discharge valves 261 and 262 from the port 238, and one of the three positions of each of the charge/discharge valves 261 to 264 is selected depending upon the lock condition of rotation of the wheels 251 to 254, thereby adjusting hydraulic pressure within the wheel cylinders 251a to 254a.

When the powered pressure is decreased for some reason, the solenoid 701 is not activated by the control circuit 290, and the changeover valve 265 is operated such that brake fluid pressure is conducted to the front and rear wheels 251 to 254 from the pressure chamber 212. The piston 209 then operates in the same manner as in the embodiment of FIG. 6.

As explained above, the auxiliary hydraulic pressure control system 700 can be controlled electrically during an anti-lock control operation in this embodiment. Also, even when the powered hydraulic pressure is decreased during the anti-lock control operation, braking force is maintained to all of the wheels, and thus this embodiment functions effectively as a fail safe system.

The present invention, as explained earlier, includes a master cylinder and a dynamic hydraulic pressure control system. The stroke on a brake pedal needed to brake the wheels is thereby shortened because boosted braking pressure is sent to the wheel cylinders by these apparatuses. If the powered hydraulic pressure is decreased for some reason braking pressure from master cylinder is applied to the front and rear wheels by the master cylinder and the changeover means. Therefore, not only a sufficient braking force, but also a balanced braking force, is attained in the present invention.

Also, it is possible to connect the front wheel cylinders to the dynamic hydraulic pressure control system, and thereby the brake pedal stroke can be further shortened.

In the embodiment wherein the changeover means is formed by an auxiliary hydraulic pressure control system, the auxiliary hydraulic pressure control system is not required to be disposed in series with the master cylinder. Accordingly the total length of the system may vary, and less restrictions are therefore put on the design of a vehicle carrying the auxiliary hydraulic pressure system and master cylinder.

What is claimed is:

1. A hydraulic braking system for automotive vehicles comprising:
   a powered hydraulic pressure source for boosting a brake fluid pressure to a predetermined pressure and transmitting a powered hydraulic pressure;
   a reservoir for storing brake fluid;
   a master cylinder for receiving the brake fluid pressure from the reservoir to a pressure chamber and transmitting the brake fluid pressure from said pressure chamber by a reactive piston slidably positioned in the master cylinder and which is tensioned by a return spring in response to movement of a brake pedal;
   a dynamic hydraulic pressure control system for adjusting and transmitting the powered hydraulic pressure from said powered hydraulic pressure source in response to one of brake pedal movement and said brake fluid pressure;
   a plurality of wheel cylinders one of which is connected to each wheel and connected through a divided dual passage system to said dynamic hydraulic pressure control system and said master cylinder; and
   a changeover means for changing over the connection between said wheel cylinders and said dynamic hydraulic pressure control system when the powered pressure transmitted from said dynamic hydraulic pressure control system is less then the predetermined pressure and introducing one of said brake fluid pressure and said powered pressure to said wheel cylinders through said divided dual passage systems, said changeover means includes a changeover valve for selectively changing over from a first position to connect said dynamic hydraulic pressure control system and said wheel cylinders and a second position to connect said master cylinder and said wheel cylinders, said changeover valve including a valve body and a piston slidably received therein; said valve body having two inlet ports in communication with said dynamic hydraulic pressure control system, an inlet in communication with said master cylinder and an outlet in communication with said wheel cylinders; said piston having an interior bore in communication with said outlet, one of said two inlet ports and said inlet; first and second check valves disposed in said bore and urged toward first and second valve seats provided therein; first and second projections provided interiorly of said valve body whereby movement of said piston in response to said dynamic hydraulic pressure control system releases one of said first and second check valves from a respective one of said first and second value seats by engagement of said one of said first and second check valves with a respective one of said first and second projections, said dynamic hydraulic pressure control system being a hydraulic pressure booster for receiving the powered hydraulic pressure from said powered hydraulic pressure source and transmitting the powered hydraulic pressure which has been adjusted to the predetermined pressure in response to said brake pedal movement.

2. The hydraulic braking system of claim 1, wherein said hydraulic pressure booster includes a valve member movable between a first position to supply the hydraulic boost pressure to the wheel cylinders associated with rear wheels of the vehicle and to a second position preventing supply of the hydraulic boost pressure.

* * * * *